3,280,395
ELECTRIC MOTOR CONTROL CIRCUIT
Elmer W. Madsen, Bristol, Conn., assignor to The Superior Electric Company, Bristol, Conn., a corporation of Connecticut
Filed Apr. 24, 1963, Ser. No. 275,418
5 Claims. (Cl. 318—138)

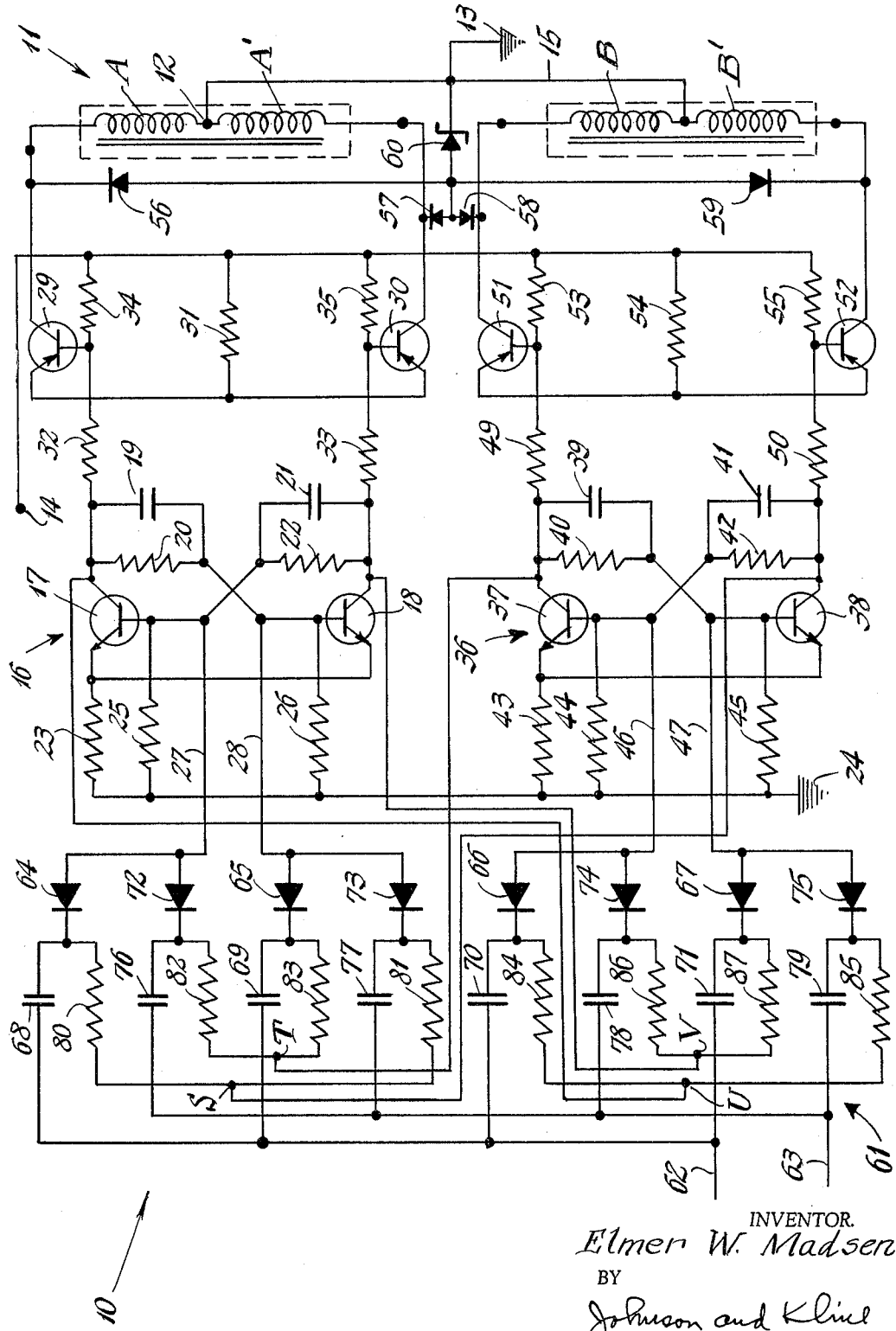

The present invention relates to an electric circuit for controlling the rotational movement of an electric motor and more particularly to such a circuit that accepts input signals or pulses and causes the motor to have a movement that is related to each pulse.

In my copending application entitled Electric Motor Control Circuit, Serial No. 65,039, filed October 26, 1960, now Patent Number 3,117,268, granted January 7, 1964, there is disclosed an electric circuit that similarly functions to translate electric input pulses into the control of the rotational movement of a motor by controlling in proper sequence the energization of the windings of the motor. While such a circuit is satisfactory, it has been found however that under certain conditions extraneously induced voltage pulses, generally referred to as electrical noise, had a tendency to affect the proper operation of such a control circuit. In addition, while such a circuit performed its intended function, it contained many parts which rendered it somewhat complex and more readily subject to malfunctioning.

An object of the present invention is to provide an electric motor control circuit that translates electrical input pulses into a determined rotational movement of an electric motor which substantially minimizes the effect of electrical noises or stray voltage pulses on the operation of the circuit.

Another object of the present invention is to achieve the above-noted object with an electric circuit that is relatively simple in construction, has few parts and in which most parts are simple, reliable, stable components.

A further object of the present invention resides in an electric motor control circuit of the above type in which the rotational movement of the motor may be controlled in either direction and yet in which stray voltage noises cannot cause the circuit to control the movement of the motor in other than the direction of a subsequent input pulse, even though the circuit has been affected by a stray pulse.

In carrying out the present invention a feature thereof resides in employing the control circuit to operate a stepper type motor. Such a motor, in the specific embodiment of the invention herein disclosed, has a permanent magnetic rotor and a stator formed with magnetizable poles having windings with the windings being formed into a first and a second winding. Each winding is formed with two winding portions which may include several interconnected coils with more than one coil on a stator pole. If the winding portions of the first winding are denoted by A and A' and the winding portions of the second winding denoted by B and B', the motor is caused to rotate in one direction by the energization of the winding portions in the following sequence A and B, A and B', A' and B', A' and B, A and B etc. Moreover by reversing the sequence of energization of the winding portions the motor may be caused to rotate in the opposite direction.

In order to enable the separation of the pulses directing movement of the motor in one direction and movement of the motor in the other direction, the control circuit of the present invention has in the embodiment herein described one input channel for controlling the rotation of the motor in a clockwise direction by the introduction of negative pulses thereon and another input channel for controlling the rotation of the motor in a counterclockwise direction, also by the introduction of negative pulses therein. While the hereinafter described embodiment of the invention utilizes negative input pulses, it will be appreciated that positive pulses may be employed by using components having a reverse polarity or bias characteristics.

Other features and advantages will hereinafter appear.

In the drawing the only figure is an electrical schematic diagram of the present invention.

Referring to the drawing, the control circuit is generally indicated by the reference numeral 10 and includes a motor 11 of the type disclosed in my aforementioned copending application that has a stator which includes winding portions A and A' and B and B'. The winding portions A and A' are connected as at their mid-point 12 to a ground 13 of a power supply having a positive input 14 while the winding portions B and B' are similarly connected also as at their mid-point to the ground 13 by a lead 15.

The energization of the winding portions A and A' in the sequence to cause rotation of the motor in one direction or another is effected by a flip-flop circuit means generally indicated by the reference numeral 16. The flip-flop means 16 is of the base trigger, bistable type and either has one transistor 17 conducting or another transistor 18 conducting their respective emitter-collector circuit at all times the control circuit 10 is in operation. The flip-flop means 16 further includes a condenser and resistor network 19 and 20 respectively connected between the collector of the transistor 17 and the base of the transistor 18 and a similar network of a condenser 21 and a resistor 22 connected between the collector of transistor 18 and the base of transistor 17. An emitter biasing resistor 23 is connected between the two emitters of the transistors 17 and 18 and a ground 24. In addition, resistors 25 and 26 are connected between the ground 24 and the base of transistors 17 and 18 to respectively cause the transistor which is not conducting in its emitter-collector circuit to have its base emitter circuit reversely biased, thereby providing for greater stability of operation.

It will be appreciated with this structure of a bistable, flip-flop circuit means 16, assuming that the transistor 17 is conducting, that the transistor 18 will not be conducting in its collector-emitter circuit by reason of the reverse biasing of its base with respect to its emitter. Moreover, it will be appreciated that the base of transistor 17, a trigger point of the flip-flop circuit, is connected to a lead 27 which will have a higher positive potential thereon (the transistors 17 and 18 are NPN types in the embodiment herein disclosed) than the base of transistor 18, the other trigger point of the flip-flop circuit which is connected to a lead 28 and thus will have a lower potential.

Upon the positive voltage in the lead 27 connected to the base of transistor 17 being decreased, the transistor 18 is caused to be conducting by the voltage increasing in the collector of the transistor 17 and thereby providing a sufficiently positive voltage at the base of transistor 18 with respect to its emitter to cause it to be conducting in its emitter-collector circuit. This in turn causes the base of transistor 17 to have a lower potential thereon by reason of the collector of transistor 18 being conducting. Thus it will be appreciated that in the absence of a trigger signal, the flip-flop circuit means 16 will have either one state with the transistor 17 or the other state with the transistor 18 conducting, and with a triggering pulse to the base of the conducting transistor the circuit will trigger causing the conducting transistor to be nonconducting and the nonconducting to be conducting. Moreover, in each state, one trigger point has a higher potential than the other with a change in state causing a shift in the higher potential to the other trigger point.

In order to enable more power to flow through the winding portions A and A' than can flow through the transistors 17 and 18, the flip-flop means 16 includes a pair of amplifying transistors 29 and 30 having their emitters connected through a resistor 31 to the positive supply 14. The base of transistor 29 is connected through a resistor 32 to the collector of transistor 17 while similarly the base of transistor 30 is connected to a resistor 33 and then to the collector of transistor 18. Moreover, the bases in addition through resistors 34 and 35 are connected to the positive lead 14.

As the transistors 29 and 30 are PNP amplifying transistors, it will be appreciated that upon conduction through the emitter-collector circuit of transistor 17 that the transistor 29 is cuased to be conducting in its emitter-collector circuit which energizes the winding portion A while if the transistor 18 is conducting, the transistor 30 conducts to energize the winding portion A'. As the conduction of the transistors 29 and 30 is controlled by the conduction of the transistors 17 and 18 respectively, when there is conduction by one transistor the other does not conduct. It will be appreciated that, if desired, the amplifying transistors 29 and 30 together with their associated components may be eliminated and the flip-flop means transistors 17 and 18 be connected directly to the motor windings.

The winding portions B and B' similarly have a flip-flop means 36 that includes a transistor 37 and a transistor 38 together with resistance and condenser networks 39 and 40 and 41 and 42 respectively. Moreover, corresponding to the resistors 23, 25 and 26 of the flip-flop means 16 are resistors 43, 44 and 45 which perform the same function. A lead 46 is connected to the base of transistor 37 a trigger point of the means 36 while another lead 47 is connected to the base of transistor 38 the other trigger point of the means 36. Similarly, through resistors 49 and 50, connections are made to the base of transistors 51 and 52 respectively that have resistors 53, 54 and 55 that correspond in function to the resistances 34, 31 and 35 and are connected to the positive ground 14. The flip-flop means 36 functions in a manner identical to the flip-flop means 16 in that it is also bistable and has either a winding portion B or B' energized depending upon conduction through the transistors 37 and 51 or 38 and 52 respectively and that a triggering through either of the leads 46 or 47 to the conducting transistor will effect a reversal of the state of conduction of the transistors.

In order to proctect the circuit 10 from inductive voltages which may be introduced by the abrupt changes in energization of the windings, there are provided diodes 56, 57, 58 and 59 connected in the manner shown together with a Zener diode 60 connected to the ground 13 such that induced voltages in excess of the breakdown rating of the Zener diode 60 are removed, though if desired, a resistance may be employed as a substitute for the diode 60.

In carrying out the control circuit of the present invention, the windings A and A' and B and B' are energized in the sequence A and B, A and B', A' and B', A' and B, A and B etc. for a clockwise rotation of the motor and the reverse sequence A and B, A' and B, A' and B', A and B', A and B etc. for the counterclockwise rotation of the motor. For effecting the proper energization of the windings which in turn is produced by proper triggering of the flip-flop means 16 and 36 through the base connected leads or trigger leads 27, 28, 46 and 47, there is provided a resistor diode and capacitance network generally indicated by the reference numeral 61. The network 61 has an input channel or lead 62 in which negative electrical input signals or pulses produce clockwise rotation of the motor and another input channel or lead 63 in which similar pulses produce a counterclockwise rotation of the motor. Structurally the network 61 consists of diodes 64, 65, 66 and 67 having their anodes connected to the triggering leads 27, 28, 46 and 47 respectively and their cathodes connected through condensers 68, 69, 70 and 71 to the input lead 62 so that four capacitances and diodes are commonly connected to the clockwise input lead 62. An identical diode capacitance network including diodes 72, 73, 74 and 75 and condensers 76, 77, 78 and 79 are connected to the trigger leads 27, 28, 46 and 47 and commonly to the input counterclockwise lead 63.

Interconnected between the junction of the diode 64 and condenser 68 and diode 73 and condenser 77 is a pair of resistances 80 and 81 of equal value having a midpoint denoted by the character S. Similarly resistances 82 and 83 having a mid-point denoted by the reference character T are connected between the junction of diodes and condensers 72 and 76 and 65 and 69, as are two resistances 84 and 85 having a mid-point denoted by the character U connected between the diode condenser junctions of diodes and condensers 66 and 70 and 75 and 79. Finally, between the junctions of the diodes and condensers 74 and 78 and 67 and 71 there are two more resistances 86 and 87 having a mid-point denoted by the character V. The mid-point S is connected to the collector of the transistor 38, the mid-point T is connected to the collector of transistor 37, the mid-point U is connected to the collector of transistor 17 and the mid-point V is connected to the collector of transistor 18. Each of the collectors is a sense point of its respective flip-flop means and the value of the resistances is all substantially the same.

In the operation of the above-described circuit 10, two winding portions are maintained energized at all times and thus in the flip-flop means 16 there is one transistor conducting or "on" and the other transistor is "off" while the same holds true for flip-flop means 36 wherein one transistor 37 or 38 is "on" and the other one is "off." Assuming that the winding portions A and B are energized, it will be appreciated that the transistor 17 is conducting as is the transistor 37. With the transistor 17 conducting the base lead 27 is at a higher positive potential than the base lead 28 of transistor 18. Additionally, the collector of transistor 17 or sense point has a lower positive potential than the collector of transistor 18 or the other sense point of the means 16. The flip-flop means 36 has with the transistor 37 conducting, a higher positive potential on the base lead 46 than that on the base lead 47 and the collector of transistor 37, a sense point of the circuit 36 connected to the point T, has a lower potential than the higher postive potential at the point S connected to the collector of transistor 38, another sense point of the circuit 36.

Upon the introduction of a negative pulse on the input lead 63 to rotate the motor counterclockwise one increment of rotation, the circuit 10 causes a change from the winding portions A and B that are energized to the winding portions A' and B being energized. The input pulse on the input lead 63 is applied to one side of all the condensers 76, 77, 78 and 79, they being commonly connected. However, the diodes 72 and 75 have at their cathode a lower potential than the diodes 73 and 74 by reason of transistors 17 and 37 conducting. In addition the diodes 72 and 74, at their anodes, have a higher potential than the potential at the diodes 73 and 75 for the same reason.

It will be appreciated that both the higher and lower potentials at the cathodes of the diodes in effect reversely bias the diodes. As used herein, the term reverse biasing and/or reverse potential indicates the condition where there is negligible or no conduction through the diode by reason of there being either an insufficient forward bias or an opposite polarity bias. Moreover, the higher potential at the cathodes of the diodes 73 and 74 is higher in value than the value of the negative input pulse while the potential at the cathodes of the diodes 72 and 75 is lower than the value of input pulse necessary to effect operation of the circuit. Accordingly, when a negative pulse is applied to a diode having a higher potential at its cathode there is no conduction through the diode as the higher potential, even minus the value of the input pulse is sufficient to maintain the diode reversely biased. With a lower potential at the cathode, a negative pulse overcomes the reverse bias potential and enables the diode to conduct.

In the situation assumed with the winding portions A and B energized, a counterclockwise pulse effects energization of the winding portions A' and B.

The diodes 73 and 74 have the higher potential at their cathodes and hence will not be affected by the input pulse. The diodes 72 and 75 have the lower potential and hence would be affected. However, the diode 75 by reason of having a lower potential at its anode, if positive, may conduct but even if it does so, it cannot change the state of the flip-flop circuit 36 as it increases the reverse biasing of the base emitter circuit of transistor 38 and makes the means 36 more resistant to a change in state. However, the diode 72 is caused to be conducting by the negative pulse as it has a higher positive potential at its anode and when it conducts it decreases the voltage in the base lead 27, triggering the means 16 to cause the transistor 17 to become nonconducting which in turn causes the transistor 18 to become conducting. This in turn deenergizes winding portion A, energizes winding portion A' and causes a counterclockwise movement of the rotor of the motor. Until a subsequent pulse appears on the input, the two windings remain energized.

Assuming the above-noted condition of windings A and B being energized, if a pulse appears on the clockwise lead 62, it will be appreciated that only the diode 66 has the necessary conditions of a lower potential at the cathode and a higher potential at the anode which is necessary to cause triggering of a flip-flop circuit means. Thus the flip-flop means 36 changes state to have the transistor 38 conduct which effects energization of the winding B' and deenergizing of the winding B causing the motor to advance clockwise a subsequent increment. The other diodes connected to the clockwise input do not have any other diode having the necessary combination of potentials at their anode and cathode which render them in condition to effect operation of one of the flip-flop circuits. Thus when the windings A and B are energized only the diode 66 has the requisite lower potential at the cathode and higher potential at the anode which enables triggering of the flip-flop 36 and the change in energization of the winding B'.

Under all conditions in the absence of a pulse and of course the circuit being energized, there is always maintained two windings energized by the circuit of the present invention. In addition, there are connected to each of the input channels only two diodes which have the requisite potential at their cathode that enables the input pulse to effect conduction through the diode. However, of the two diodes, the effect of the negative pulse is such as to make the flip-flop circuit of one even more resistant to a change in state, thus more assuring that the other diode will conduct to change the winding portion's energization in the proper sequence. Even if under some strange circumstances pulses were introduced into one input channel and a stray pulse was introduced into the other channel, the stray pulse may effect incremental movement in the wrong direction and make the circuit lose one increment, but by reason of the circuit presenting only two diodes capable of effecting triggering with one in each channel, the stray pulse cannot cause the subsequent pulses on the channels to make the motor rotate in other than the way the pulses are presented at the input channels.

It will accordingly be appreciated that there has been disclosed an electric motor control circuit that translates electrical pulses into incremental movement of a motor by changing the energization of winding portions. The circuit is composed of relatively few parts most being reliable, stable components and are interconnected in a manner which substantially minimizes the effect of stray electrical noise on the circuit.

Variations and modifications may be made within the scope of the claims and portions of the improvements may be used without others.

I claim:

1. A control circuit responsive to input pulses for controlling movement of a motor in one direction having a first winding which is energized of one polarity or the other and a second winding which is energized of one polarity or the other with each input pulse alternately shifting the polarity of the first and second windings comprising a first two-state bistable flip-flop means having an output connected to the first winding for energizing the first winding of one polarity for one state and the other polarity for the other state, a second flip-flop means having an output connected to the second winding for energizing the second winding of one polarity for one state and the other polarity for the other state, each of said flip-flop means including two transistors with each having a trigger point and a sense point with one trigger point at one state being at a higher potential than the other and with the other trigger point being at a higher potential than the one at the other state and with the sense point of the transistor having the higher potential trigger point being at a lower potential than the sense point of the transistor having the lower potential trigger point, an input channel for receiving pulses, four diodes with each having an anode and cathode end, means connecting the diodes to the trigger points with only one diode being connected to only one trigger point and to said input channel with the diodes all being conductive in the same direction, and means connecting the sense points to the diodes with only one diode being connected to only one trigger point, to place a reverse potential on said diodes, only two of said diodes having a higher reverse potential than the other two.

2. The invention as defined in claim 1 in which the higher reverse potential on the two diodes has a higher value than the value of the input pulse and the lower reverse potential on two diodes has a value less than the input pulse.

3. The invention as defined in claim 1 in which the two diodes having the higher reverse potential have one diode connected to a trigger point of one flip-flop means that has a higher potential and the other diode to the trigger point of the other flip-flop means that has the lower potential.

4. A control circuit responsive to input pulses on two separate input channels for controlling movement of a motor having a first winding which is energized of one polarity or the other and a second winding which is energized of one polarity or the other with each input pulse alternately shifting the polarity of the first and second windings comprising a first two-state bistable flip-flop means having an output connected to the first winding for energizing the first winding of one polarity for one state and the other polarity for the other state, a second flip-flop means having an output connected to the second winding for energizing the second winding of one polarity for one state and the other polarity for the other state, each of said flip-flop means including two transistors with each having a trigger point and a sense point with one trigger point at one state being at a higher potential than the other and with the other trigger point being at a higher potential than the one at the other state and with the sense point of the transistor having the higher potential trigger point being at a lower potential than the sense point of the transistor having the lower potential trigger point, eight diodes with each having an anode and cathode ends, means connecting the similar ends of the diodes in parallel to form four pairs of diodes, means connecting the diodes to the trigger points, one pair to each trigger point, means connecting one of each pair to each input channel with the diodes being connected to be conductive in the same direction and means connecting the sense points to the diodes with each sense point being connected to two diodes with the two diodes being one of two pairs of diodes, to place a reverse potential on said diodes, only two of said diodes connected to one input channel having a higher reverse potential than the other two and only two of said diodes connected to the other input channel having a higher reverse potential than the other two.

5. The invention as defined in claim 4 in which the last-named means includes a resistance positioned in the connection between each sense point and its connected two diodes with the resistances being substantially equal and limiting the value of the reverse potential.

References Cited by the Examiner

UNITED STATES PATENTS 3,124,732   3/1964   Dupy _____ 318—138

ORIS L. RADER, *Primary Examiner.*

G. FRIEDBERG, *Assistant Examiner.*